Aug. 12, 1941.  F. SHENTON  2,252,526
OUTSIDE TYPE SEAL
Filed May 6, 1939
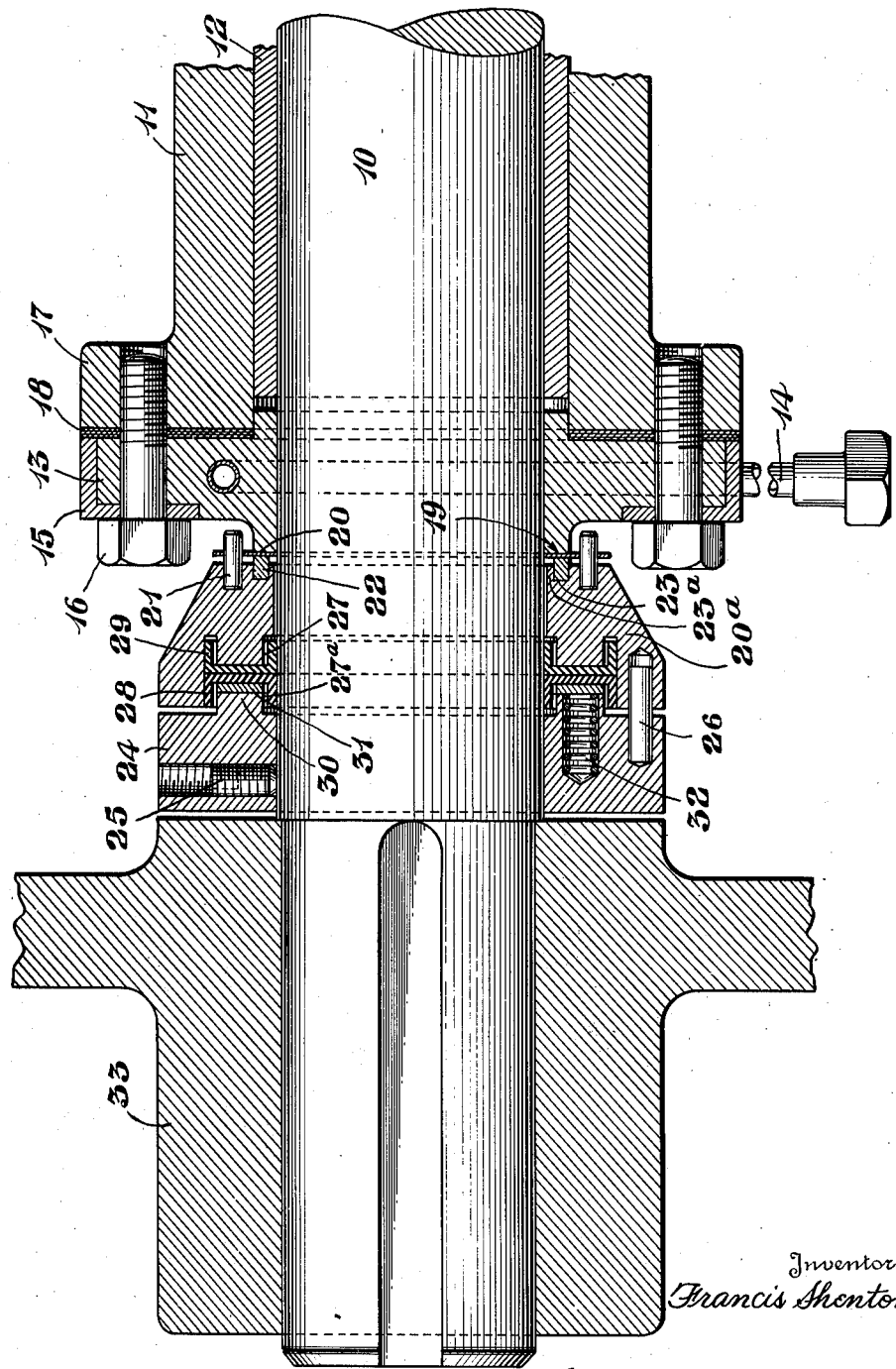
Inventor
Francis Shenton
By A. Yates Dowell
Attorney

UNITED STATES PATENT OFFICE 2,252,526

OUTSIDE TYPE SEAL

Francis Shenton, Waynesboro, Pa., assignor to Frick Company, Waynesboro, Pa., a corporation of Pennsylvania Application May 6, 1939, Serial No. 272,275

7 Claims. (Cl. 286—7)

This invention relates to means for effecting a pressure-tight seal around a shaft where it passes through a wall, as for example the wall of the crankcase of a compressor for a refrigeration system.

The present invention may be considered in the nature of an improvement on, or as an alternative type of installation with respect to that disclosed in my copending application Serial No. 170,683 filed October 23, 1937, and wherein a shaft seal is provided which is coordinated with the seal of my prior Patent No. 2,020,436 to produce a highly effective sealing assembly particularly adapted for use in refrigeration systems in which the gas pressure in the compressor crankcase fluctuates above and below atmospheric pressure.

In general, the seal of my copending application operates satisfactorily. However, should it be desired to make an installation where the shaft is worn or scored, the packing rings which seal along the shaft sometimes come directly over, or operate within the region of such scored or worn portions, with the result that the said rings have their efficiency impaired during service. This is due to the fact that the seal assembly of my prior application above noted is of the inside type, or the sealing unit is installed inside the stuffing box, gland or the like located adjacent the point where the shaft projects through the crankcase housing. Furthermore, with the seal of the inside type it becomes extremely difficult to gain access to the seal assembly or to the portion of the shaft encircled thereby after installation of the assembly.

The seal of the present application, as in the case of that of my copending application, is coordinated with a seal and wear ring unit of the general type illustrated in my Patent No. 2,020,436, the construction and arrangement being such that regardless of whether the pressure in the compressor crankcase is above or below atmospheric, a tight seal ensues against fluid leakage along the shaft and simultaneously the seal ring for preventing leakage of fluid from the housing is urged against its coacting sealing face. The packing means which seals longitudinally or axially of the shaft is constructed and operates in a manner such that relative movement between the shaft and those portions of the packing means in contact therewith takes place with greater ease and less friction than is the case with the angle-shaped packing rings of my copending application. Also, the sealing assembly is outside of the wall of the crankcase housing, or the gland or stuffing box which encircles the shaft at this point, and is readily accessible from the exterior of said housing.

The objects and advantages of the invention will become more apparent in view of the following description taken in conjunction with the drawing, wherein the single figure is a substantially central longitudinal sectional view of a shaft seal assembly illustrating one application of the invention.

Referring to the drawing in detail, a shaft is indicated at 10, said shaft extending through a wall 11 of the housing or crankcase of a compressor (not shown) for a refrigerating system and by means of which power is supplied for driving the compressor. A bearing 12 is provided around the shaft within the housing 11. A gland 13, which is preferably made of Babbitt or other anti-frictional metal, is disposed around the shaft beyond the bearing 12 and has therein a cooling coil 14 through which cooling water may be circulated. The Babbitt metal of the gland 13 is shown as being cast in an annular steel ring 15 which provides a seat for cap screws 16 securing the gland against flange 17. Between the gland 13 and flange 17 is a gasket 18 for effecting a fluid-tight joint at this point.

At its outer end, the gland 13 is reduced providing a seal nose or sealing face 19 against which a flexible seal and wear ring 20 contacts, said ring being secured to and rotating with annular member or ring 20a, the connection being made by means of studs or dowel pins 21. A packing ring 22, which may be of a "Neoprene" or similar packing material, is provided and is seated in an annular recess 23 formed in ring 20a and is maintained separate from the shaft by the inner wall 23a of said recess.

The sealing ring 20 and packing ring 22 may be substantially similar to the like parts disclosed in my prior patent above noted.

A drive ring 24 is mounted around the shaft outwardly of the ring 20a and is secured for rotation with the shaft through the medium of screws or studs 25. The ring 20a is connected to the annular member or ring 24 through the medium of drive pins or dowels 26 which hold these parts against relative rotation yet permit the annular member 24 to move longitudinally of the shaft.

The ring 20a is recessed to provide a seat for coacting packing rings 28 and 29 which are preferably substantially channel or C-shaped in cross section and arranged in abutting relation back to back, with the inner and outer flanges of the channel or C projecting in opposite directions. A certain amount of clearance is provided between the inner oppositely projecting flanges of the rings 28 and 29 and the walls outwardly thereof, as indicated at 27 and 27a. The drive ring 24 is formed with an annular boss 30, and between this boss and the ring 28 is a thrust washer 31. Springs 32 are mounted in the drive ring 24 and exert thrust against the washer 28 to thereby constantly mechanically urge the ring 20a and the seal ring 20 against its coacting surface 19 and maintain a fluid-tight relationship between these parts irrespective of wear and/or axial movement of the shaft 10.

The part indicated at 33 illustrates the hub of a flywheel which is keyed on the shaft 10 and rotates therewith.

The seal assembly operates as follows:

Should pressure in the crankcase rise above atmospheric, refrigerant gas has a tendency to travel along the shaft 10 outwardly, and since it cannot escape between the seal ring 20 and the surface 19, it passes on to and contacts the lower inner flange of the ring 29 and then passes into the space 27, driving the inner flange of the ring into sealing contact with shaft 10 and creating an unbalanced pressure on the ring 20a and forcing this ring together with the ring 20 towards the seal face 19, the sealing pressure being in direct proportion to the gas pressure. Should pressure in the crankcase drop below atmospheric, outside atmosphere has a tendency to travel inwardly along the shaft end and contacts the inner flange of the ring 28 and passes into recess 27a, thereby forcing the said ring 20a and the ring 20 again in the same direction as before, or with the sealing ring 20 against the seal face 19. Thus, regardless of whether the crankcase pressures are super or subatmospheric, the sealing ring 20 is urged against the sealing face 19, but any tendency of the air to leak inwardly of the crankcase or fluid to leak outwardly from the latter is counteracted by the rings 28 and 29.

The substantially C-shaped rings 28 and 29, being placed at opposite directions and back to back, whenever gas or atmospheric pressure encounters the inner flanges of these rings and passes into the clearance spaces in rear thereof, they are urged together with the inner and outer flanges thereof forced into sealing relation against adjacent surfaces, so that there is no tendency at any time for the rings to blow out. This arrangement also permits relatively easy sliding movement of the inner flanges of the rings on the shaft, so that the seal may adjust itself. When the pressure in the crankcase is above atmospheric, the flexible sealing and wear ring 20 and the coacting sealing surface 19 carries the total unbalanced pressure. However, the bearing surfaces are so proportioned that they are liberal in size to carry this thrust load.

It will thus be seen that irrespective of pressure fluctuation in the crankcase of the compressor, a fluid-tight seal is maintained either outwardly from or inwardly into the crankcase.

Since the sealing units are exterior of the crankcase, they are readily accessible at all times for replacement, and also for smoothing the surface of the shaft at the area where the rings 28 and 29 operate. Practical experience has demonstrated that the seal is highly effective and capable of long service.

The springs 32 function to maintain a fluid-tight joint between the metallic seal ring 20 and its coacting sealing surface 19 and do not effect a binding action of the inner flanges of the rings 28 and 29 on the shaft, such action resulting only from fluid or air encountering said flanges due to fluctuation of crankcase pressures. However, whenever the said inner flanges of the rings 28 and 29 are subjected to fluid pressure, the mechanical sealing pressure effected by the springs 32 is auxiliated by the fluid pressure, so that the sealing pressure at the radial joint between the ring 20 and the surface 19 is in direct proportion to the pressure of the fluid resulting from fluctuation of the crankcase pressures.

It will be understood that certain changes may be made in the improved seal assembly without departing from the spirit or scope of the invention and therefore the invention is not limited to what is shown in the drawing and described in the specification but only as indicated in the appended claims.

What is claimed is:

1. A fluid pressure seal for the joint between a shaft and a relatively stationary member through which the shaft extends, comprising an axially directed seal nose having a sealing surface, a metallic seal ring surrounding said shaft and contacting said sealing surface, a compressible packing ring engaging said metallic seal ring, additional substantially channel or C-shaped packing means mounted within cooperative adjacency to said seal ring with the inner and outer flanges of the channel or C extended in opposite directions substantially axially of the shaft, a recessed annular housing member having an operative connection with the metallic seal ring and mounted for limited axial movement on said shaft and having said packing means disposed in the recess thereof with the inner flanges of the packing means disposed to exert sealing pressure against said shaft, and means connecting said housing member for rotation with the shaft yet permitting limited axial movement thereof and whereby when fluid pressure is exerted in either direction axially of said shaft, it encounters the inner flanges of said rings and creates an unbalanced pressure on the housing member therefor and through the latter exerts a sealing thrust on the seal ring.

2. A fluid pressure seal for the joint between a shaft and a relatively stationary member through which the shaft extends, comprising an axially directed sealing surface, a metallic seal ring surrounding said shaft and contacting said sealing surface, a compressible packing ring engaging said metallic seal ring out of contact with the shaft, additional substantially channel or C-shaped packing means mounted within cooperative adjacency to said seal ring with the inner and outer flanges of the channel or C extended in opposite directions substantially axially of the shaft, said inner flanges being arranged for sealing contact with said shaft, an annular housing member operatively connected to said seal ring and having a recess therein in which said packing means is mounted, means connecting said housing member for rotation with the shaft yet permitting limited axial movement of the same longitudinally of the shaft and whereby fluid pressure exerted in either direction longitudinally of the shaft encounters the inner flanges of said packing means and urges the said latter flanges in sealing contact with the shaft while simultaneously exerting pressure on said housing member axially of the shaft and urging the seal ring in firmer contact with its coacting sealing and bearing surface, and means mechanically maintaining said seal ring in sealing contact with its coacting sealing surface.

3. A fluid pressure seal for the joint between a shaft and a relatively stationary member through which the shaft extends, comprising a stationary housing member having a sealing surface associated therewith and directed axially outwardly of the shaft, a metallic seal ring surrounding said shaft and contacting said sealing surface, a compressible packing ring engaging said seal ring, an annular member connected to said metallic seal ring for rotation therewith, said annular member having a substantially channel-shaped recess therein, additional packing means of substantially channel or C-shape in cross section disposed in said recess with the inner flanges of the channel extended in opposite directions and in contact with the shaft, there being a clearance space between the flanges of the C-shaped packing means and the adjacent wall of the recess in which said means is mounted, means connecting said annular member for rotation with the shaft while permitting limited movement of said member axially of the shaft and whereby gas or fluid pressure exerted longitudinally of the shaft either inwardly or outwardly along the shaft encounters said inner flanges and passes in rear thereof between the packing and the annular member which houses the same and urges the annular member together with the metallic seal ring towards its coacting sealing surface, and means mechanically urging said seal ring against its coacting sealing and bearing surface.

4. A fluid pressure seal for the joint between a shaft and a relatively stationary member through which the shaft extends having a sealing surface associated therewith and facing axially outwardly of the shaft, comprising in combination a metallic seal ring surrounding said shaft and contacting said sealing surface, a compressible packing ring engaging said seal ring radially outwardly of and out of contact with the shaft, a pair of substantially channel or C-shaped packing rings mounted within cooperative adjacency to said seal ring with the inner and outer flanges of the channel or C extended in opposite directions, an annular housing ring operatively connected to said seal ring at one end and at its opposite end having a recess therein in which said packing rings are mounted with the inner flanges of the same arranged for sealing contact with the shaft and the outer flanges thereof backed up by the walls of the recess, there being clearance sufficient to permit pressure to build up between the flanges of said packing rings and adjacent wall of the recess, a drive ring connected for rotation with the shaft and also connected to said annular housing ring causing the latter to rotate with the shaft yet permitting limited axial movement of the housing ring, gas or atmospheric pressure exerted in either direction axially of the shaft encountering the inner flanges of said packing means and passing in rear thereof and exerting thrust on said housing ring and causing the latter to urge the seal ring against its sealing and bearing surface, and spring means mounted in said drive ring and arranged to exert thrust on said metallic seal ring.

5. In apparatus having a rotating shaft projected through an opening in a housing containing a fluid under pressure, for example, the crankcase of a compressor for a refrigerating system, a fluid pressure seal assembly for the joint between the shaft and housing comprising a sealing ring out of contact with the shaft and having an axially presented sealing surface coacting with a like presented sealing surface to effect a seal against leakage radially outwardly of the shaft, flexible packing members surrounding and having portions in contact with the shaft for effecting a seal against leakage axially of the shaft, means operatively connecting said flexible packing members with said sealing ring, said flexible packing members being constructed and arranged to entrap fluid under pressure either interiorly or exteriorly of said housing and transmit such pressure through said connecting means to said first-named sealing ring and exert an axial sealing thrust on the latter.

6. In apparatus having a rotating shaft projected through an opening in a housing containing a fluid under pressure, for example, the crankcase of a compressor for a refrigerating system, a fluid pressure seal assembly for the joint between the shaft and housing comprising a sealing ring having an axially presented sealing surface cooperating with a like presented sealing surface on the housing to effect a seal against leakage radially outwardly of the shaft, a substantially annular channel-shaped flexible packing ring surrounding the shaft beyond said sealing ring, an axially movable annulus connecting said flexible packing ring with said sealing ring, said annulus having a pair of radially spaced annular recesses in the axial face thereof remote from said sealing ring and said packing ring having radially inner and outer flanges projecting axially toward the housing and positioned in said recesses with the inner flange in contact with the shaft and the outer flange contacting the radial outer wall of the outer recess, whereby fluid attempting to escape from the housing axially outwardly along the shaft engages the inner flange and is entrapped between the packing ring and recessed face of the annulus, causing the annulus to exert an axial thrust on the sealing ring, and means detachably connected to and rotating with the shaft holding the sealing ring, annulus and flexible packing ring in assembled relation on the shaft.

7. In apparatus having a rotating shaft projected through an opening in a housing containing a fluid under pressure, for example, the crankcase of a compressor for a refrigerating system, a fluid pressure seal assembly for the joint between the shaft and housing comprising a sealing ring having an axially presented sealing surface cooperating with a like presented sealing surface on the housing to effect a seal against leakage radially outwardly of the shaft, a substantially annular channel-shaped flexible packing ring surrounding the shaft axially outwardly beyond said sealing ring, an axially movable annulus connecting said flexible packing ring with said sealing ring, said annulus having a pair of radially spaced annular recesses in the axial outer face thereof and said packing ring having radially inner and outer flanges projecting axially toward the housing and positioned in said recesses with the inner flange in contact with the shaft and the outer flange contacting the radial outer wall of the outer recess, whereby fluid attempting to escape from the housing axially outwardly along the shaft engages the inner flange and is entrapped between the packing ring and recessed face of the annulus causing the annulus to exert an axial thrust inwardly on the sealing ring, said sealing ring, annulus and flexible packing ring being located as a unit exterior of the said stationary member, a drive ring detachably connected to and rotating with the shaft exterior of said unit for holding the latter in assembled relation on the shaft, and mechanical means carried by said drive ring maintaining a resilient axial thrust on said annulus and sealing ring.

FRANCIS SHENTON.